United States Patent [19]

Kawaji

[11] Patent Number: 5,321,530
[45] Date of Patent: Jun. 14, 1994

[54] IMAGE FORMATION SYSTEM EMPLOYING OPTICAL MEMORY

[75] Inventor: Seiji Kawaji, Nara, Japan

[73] Assignee: Sharp Kabushiki Kaisha, Osaka, Japan

[21] Appl. No.: 872,596

[22] Filed: Apr. 23, 1992

[30] Foreign Application Priority Data

Apr. 23, 1991 [JP] Japan ................................ 3-092271

[51] Int. Cl.$^5$ ............................................. H04N 1/46
[52] U.S. Cl. ..................................... 358/501; 358/524; 358/468; 358/401; 358/296; 358/404; 346/108
[58] Field of Search .................... 358/75, 78, 296, 404, 358/444, 401, 468, 501, 524; 359/36; 346/107 R, 108; 395/162, 163

[56] References Cited

U.S. PATENT DOCUMENTS

| | | | |
|---|---|---|---|
| 3,796,999 | 3/1974 | Kahn | 358/302 |
| 4,080,058 | 3/1978 | Stephany | 355/14 |
| 4,564,853 | 1/1986 | Egan | 359/45 |
| 4,783,146 | 11/1988 | Stephany et al. | 346/160 |
| 4,842,976 | 6/1989 | Sanders et al. | 430/138 |
| 4,860,119 | 8/1989 | Maniwa et al. | 358/296 |
| 4,941,038 | 7/1990 | Walowit | 358/78 |
| 4,941,735 | 7/1990 | Moddel et al. | 350/342 |
| 4,958,298 | 9/1990 | Okamoto | 358/296 |
| 5,170,270 | 12/1992 | Yamamoto et al. | 340/713 |
| 5,220,566 | 6/1993 | Ikenoue | 340/825.1 |

FOREIGN PATENT DOCUMENTS

| | | |
|---|---|---|
| 0291300 | 11/1988 | European Pat. Off. . |
| 0416657 | 3/1991 | European Pat. Off. . |
| 59-30537 | 2/1984 | Japan . |
| 64-20773 | 1/1989 | Japan . |
| 3-16824 | 3/1991 | Japan . |

OTHER PUBLICATIONS

European Search Report in corresponding European Patent Application issued by European Patent Office on Jan. 25, 1993.

Primary Examiner—Edward L. Coles, Sr.
Assistant Examiner—Fan Lee
Attorney, Agent, or Firm—David G. Conlin; Henry D. Pahl, Jr.

[57] ABSTRACT

An image formation system includes one or more image data output device for outputting images composed of three primary colors for full color imaging, and imaging system including a printer where beam light is used to selectively transfer image data from any of the image data output device in an optical image memory, a connecting device for selectively connecting more than two of the image data output device to the printer, a detecting device for detecting whether each of the image data output device is connected to the printer, an erasing device for erasing images remnant in the optical image memory, and a control device for receiving output from the detecting device to operate the erasing device at each end of a period for which each data output device has been connected to the printer.

5 Claims, 6 Drawing Sheets

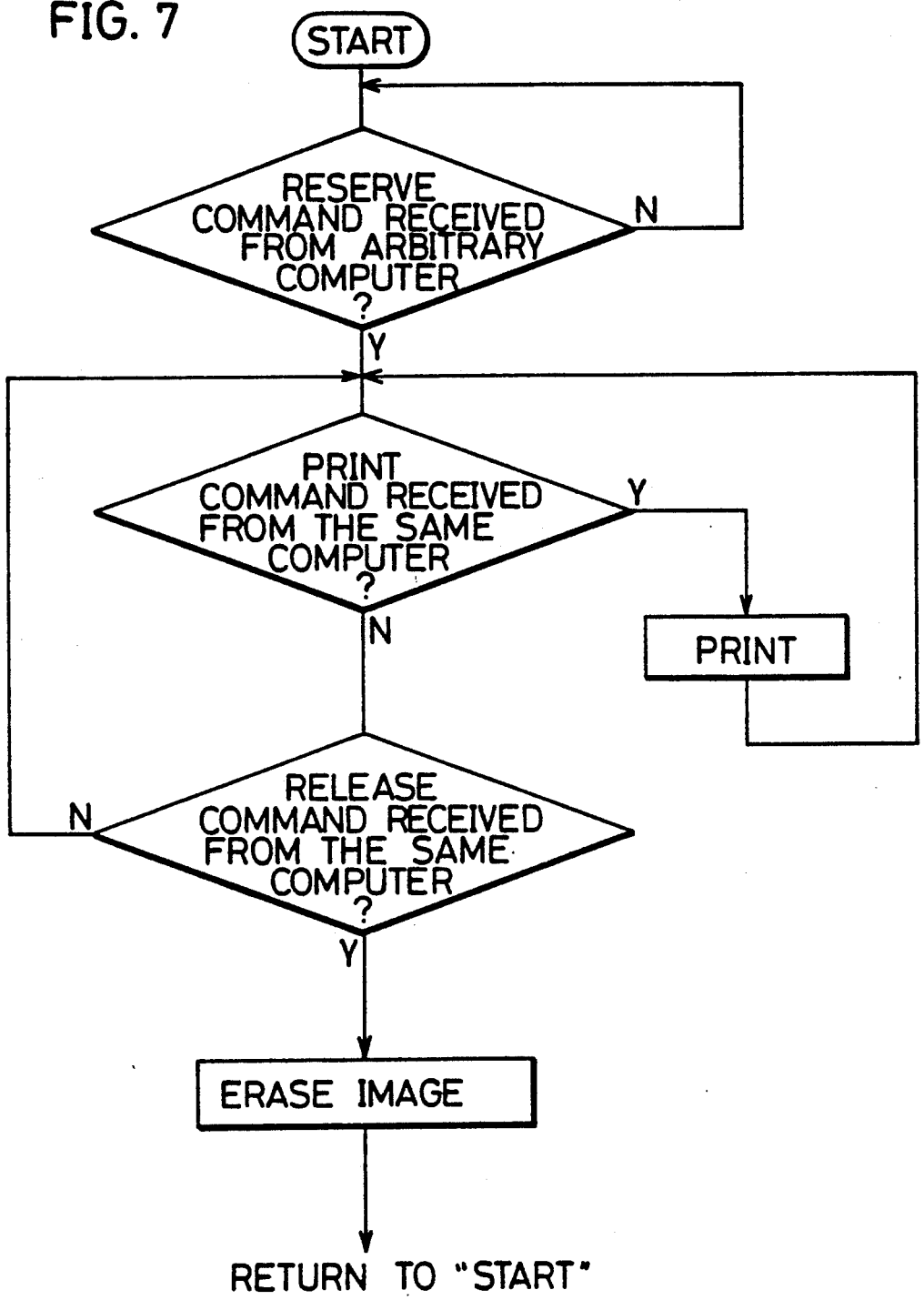

IMAGE FORMATION SYSTEM EMPLOYING OPTICAL MEMORY

BACKGROUND OF THE INVENTION

1. Field of the Invention

The present invention relates to an image formation system in which beam light is employed to store an image data in an optical image memory and the image stored therein is read and printed out.

2. Description of the Related Art

U.S. Pat. No. 3,796,999 discloses a display in which laser light selectively irradiates liquid crystal cell to display an image on the liquid crystal array. According to the invention disclosed therein, heat of the laser light is utilized to partially change a phase of the liquid crystal, and an image can be formed depending upon an irradiation pattern of the laser light. The liquid crystal cell employed is, for example, a smectic liquid crystal.

Japanese Unexamined Patent Publication SHO/64-20773 discloses a device in which a thermal writing liquid crystal cell device is employed to form an image. According to the invention disclosed therein, transmitting light through a liquid crystal cell layer or reflecting light therefrom irradiates photosensitive material to make a latent image on the photosensitive material, and an image can be formed based upon the latent image. There are provided three kinds of liquid crystal cells where respective images of primary colors, red (R), green (G) and blue (B), are to be written, and a full color image is composed of the three types of images.

In such a conventional image formation system, an image formation device (printer) receives image data from a single image data output means (e.g., computer) to form an image, namely, print out the image.

However, in a system architecture where such a single image formation device is connected to two or more computers for carrying out the print out of the image data from each computer sequentially, in a situation that a previous image is still remnant in the liquid crystal cell device after an access of one of the computers to the image formation device has completed, that is, staying of an image in the liquid crystal cell device by the previous image data from another computer, the different images overlap or mix with each other in the liquid crystal cell device. Thus, there is a disadvantage that a normal image cannot be obtained.

SUMMARY OF THE INVENTION

The present invention provides an image formation system including: one or more image data output means for outputting images composed of three primary colors for full color imaging, an imaging system including a printer where beam light is used to selectively transfer image data from any of the image data output means in an optical image memory, connecting means for selectively connecting more than two of the image data output means to the printer, detecting means for detecting whether each of the image data output means is connected to the printer, erasing means for erasing contents remnant in the optical image memory, and control means for receiving output from the detecting means to operate the erasing means at each end of a period for which each data output means has been connected to the printer.

Preferably, the one or more image data output means as mentioned above is one or more host computers for outputting image data and command data, and the detecting means receives the command data from the computer to detect whether the computer is connected to the printer.

Further preferably, the optical image memory includes a liquid crystal cell, and the beam light is laser light modulated by the image data.

Yet preferably the erasing means is a cell eraser for applying a specified voltage to the liquid crystal cell.

Still yet preferably, the liquid crystal cell is irradiated with laser beam for writing an image from its front surface while it is irradiated with light for reading the image from its rear surface.

Thus, when a period (access period) for which one of the image data output means is connected to the printer ends, the detecting means detects it, and the erasing means operates to erase the contents stored in the optical image memory. In this way, the image data from a new image data output means can be stored in normal state in the optical image memory without overlapping with remaining image data.

BRIEF DESCRIPTION OF THE DRAWINGS

FIG. 7 is a flow chart showing an operation of a major portion of the embodiment according to the present invention.

DETAILED DESCRIPTION OF THE PREFERRED EMBODIMENT

Figure 1:
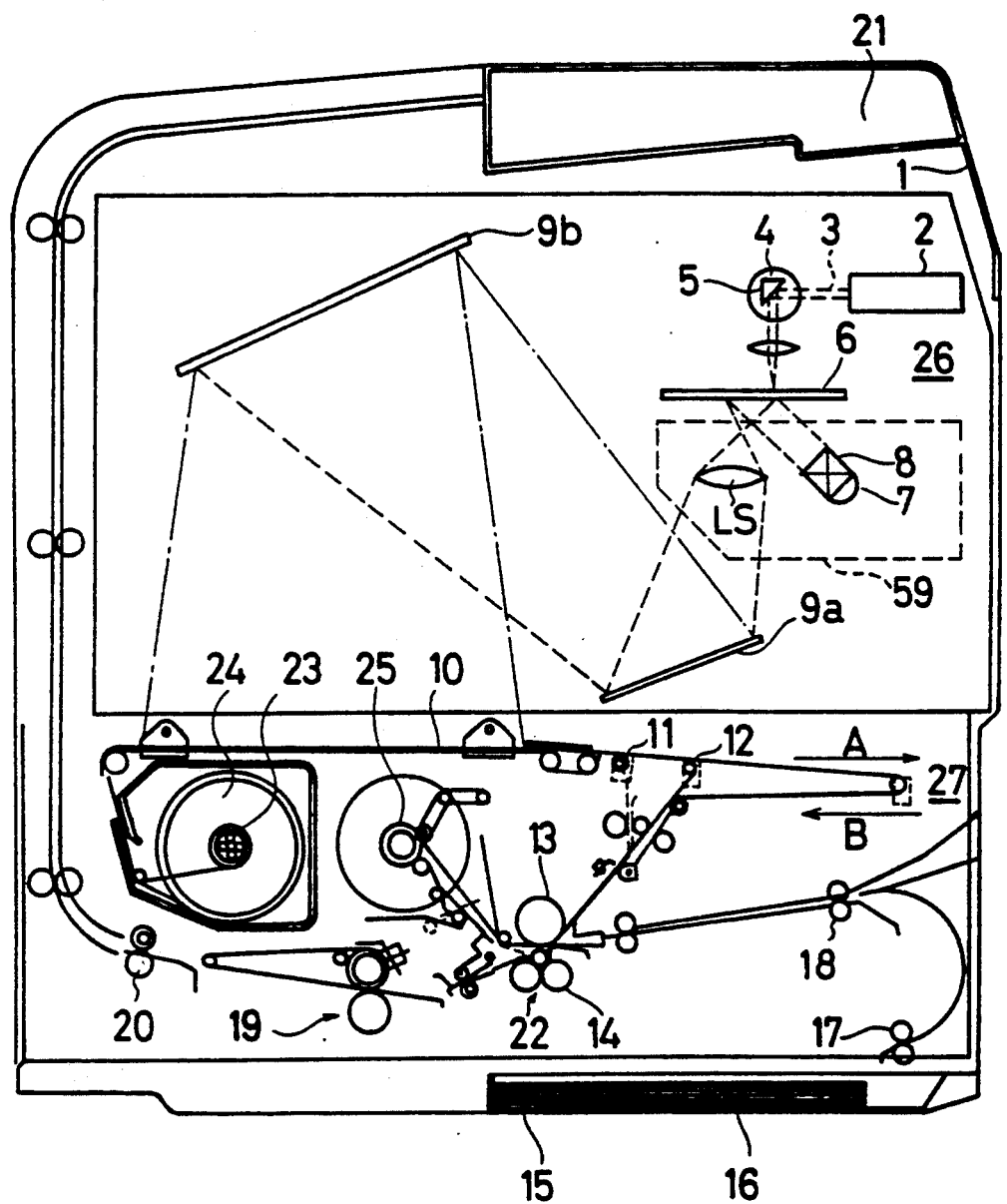
FIG. 1 is a diagram showing a structure of an embodiment according to the present invention.

FIG. 1 is a schematic diagram showing a structure of an image formation device (printer) of an embodiment according to the present invention. In this image formation device, usually incorporated are a photosensitive sheet (media sheet) and an image receiving sheet; the former is coated with microcapsules containing photo curing material and image forming agent, and the latter is coated with thermo-plastic resin forming a developing material which reacts with the image forming agent to develop colors.

The image formation device can be generally divided into two, upper and lower units. The upper unit comprises an image writing means and exposing unit 26, which has, as viewed in upper right, a laser diode 3 emitting laser beam 3, a rotary encoder motor 4, a primary scanning mirror 5, a liquid crystal cell unit 6, an exposing optical system 59 and a mirror 9a. The exposing optical system 59 includes an exposing lamp 7, a color filter unit 8 and a lens LS. Also, the exposing unit 26 has a mirror 9b, as viewed in upper left. The other half, namely, the lower unit is a developing unit 27 including, as viewed in the left, a media sheet 24 wound on a supply shaft 23, and this sheet is provided with a path up to a take-up shaft 25. That is, along the media sheet 24 path starting from the supply shaft 23, an exposing panel 10, an automatic carrier roller 11, a buffer roller 12 and pressing rollers 13 and 14 are installed in position. As viewed in the lower right of this unit, a cassette 15 is attached, and the cassette 15 holds a mass of image receiving sheets 16. On a path between the cassette 15 and a pressure developing unit 22 along which the image receiving sheets are carried, a supply roller 17 and a timing roller 18 are disposed. A lustering apparatus 19 is positioned in the left of the pressure developing unit 22, and furthermore, in the left of the lustering apparatus 19, in turn, a sheet discharger roller 20 is arranged. A cabinet 1 has a sheet discharging unit 21 in its top.

Figure 2:
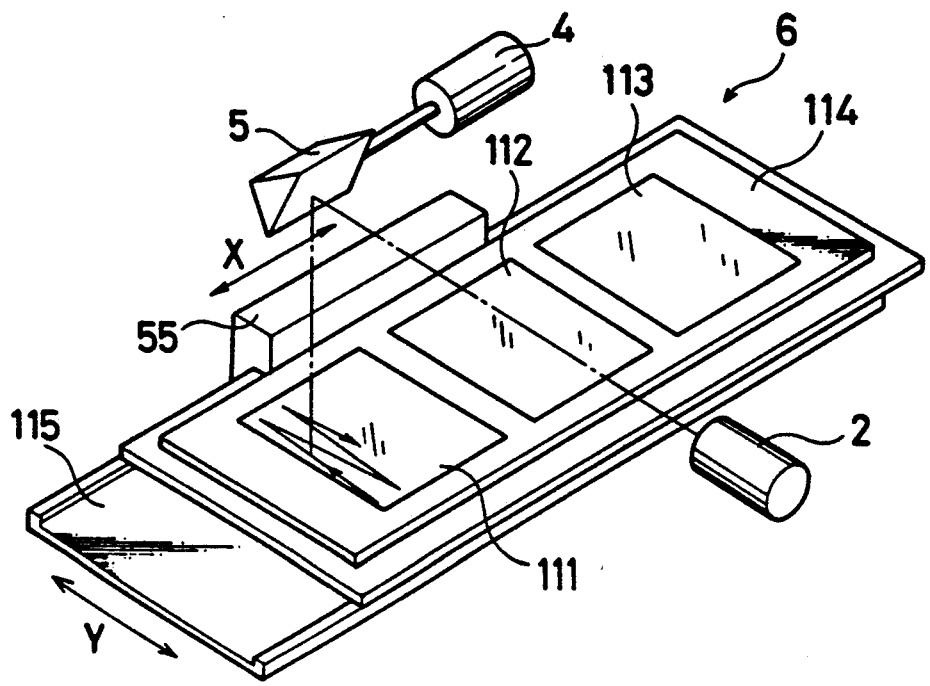
FIG. 2 is a diagram showing a major portion of the embodiment shown in FIG. 1.
Figure 3:
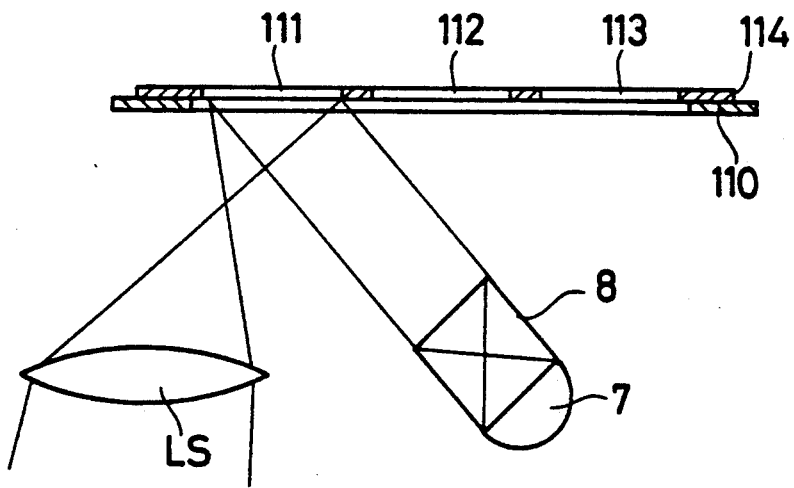
FIG. 3 is a diagram showing a control unit of the embodiment shown in FIG. 1.

FIGS. 2 and 3 show detailed structures of major portions included in FIG. 1. Referring to FIGS. 2 and 3, the liquid crystal cell unit 6 includes three liquid crystal cell arrays 111, 112 and 113, which are all fixed in a frame 114 and supported by a liquid crystal supporting unit 110. The liquid crystal supporting unit 11 can be moved in an X-axis direction (in a secondary scanning direction), and a linear encoder motor (a linear motor coupled with a linear encoder) 55 controls to move it accurately. A writing apparatus including the laser diode 2, primary scanning mirror 5 and rotary encoder motor (motor coupled with a rotary encoder) 4 is arranged above the liquid crystal supporting unit 110. In writing an image, reciprocally pivoting the mirror 5 while the supporting unit 110 is moved in the X-axis direction, laser beam scans the liquid crystal cell 111 in the Y-axis direction (primary scanning direction) as shown by arrow in FIG. 2 to perform image writing.

The color filter unit 8 in the exposing optical system 59 has a color separating filter and a shutter (both of them are not shown). Each time the liquid crystal supporting unit 110 moves in the X-axis direction (FIG. 2) until the liquid crystal cells reach their respective specified positions, the shutter of the color filter unit 8 opens to scan a plane surface of each of the liquid crystal cells, and reflected light from the surface is directed to travel through the lens LS towards the exposing panel 10 and irradiate the media sheet 24 to image the contents thereof. The liquid crystal cells 111 to 113 are for red (R), green (G) and blue (B) images, respectively. The color separating filter in the color filter unit 8 is meant to selectively transmit light of specified colors, and specifically, it includes three sorts of filters: an R filter which transmits wavelength of red, a G filter which transmits wavelength of green, and a B filter which transmits wavelength of blue. The filter is switched with the R filter for transmitting wavelength of red in reading a liquid crystal cell where a red (R) image is stored, switched with the G filter for transmitting wavelength of green in reading a liquid crystal cell where a green (G) image is stored, or switched with the B filter for transmitting wavelength of blue in reading a liquid crystal cell where a blue (B) image is stored. The R, G and B filters are attached to a turn disk (not shown) which is driven by a motor, slits cut in the turn disk allows a specified one of the R, G and B filters to be positioned on an axis of light emitted by the lamp 7. The shutter of the color filter unit 8 is also formed with a turn disk (not shown) with an aperture which is driven by a motor, and slits cut in the turn disk are utilized to detect open or close of the shutter.

When light of red, green or blue which is reflected from the liquid crystal cell unit 6 is directed to travel through the lens LS, and the mirrors 9a and 9b to the media sheet 24 on the exposing panel 10 to image on the media sheet 24, the buffer roller 12 moves in a direction of arrow A. As a result of the operation so far, the media sheet 24 is provided with an image thereon by selective hardening. The media sheet 24 may be, for example, overlaid with a photosensitive and pressure sensitive sheet which can accommodate full color as disclosed in Japanese Unexamined Patent Publication SHO/59-30535, which is coated on its surface uniformly and scatteringly with three sorts of microcapsules: ①  microcapsules containing light hardening material which is sensitive to red light, and image forming agent which develops cyanogen, ② microcapsules containing light hardening material which is sensitive to green light, and image forming agent which develops magenta, and ③ microcapsules containing light hardening material which is sensitive to blue light, and image forming agent which develops yellow.

After the media sheet 24 is exposed to light, the take-up shaft 25 is revolved and the buffer roller 12 is moved in a direction of arrow B, so that the media sheet 24 which has an image formed by selective hardening is sent to the pressure developing unit 22. On the other hand, the image receiving sheets 16 which are supplied one by one from the cassette 15 are carried by the supply roller 17 and stop at the timing roller 18 to stand by there. After the buffer roller 12 start to move in the direction of arrow B, the one of the image receiving sheets 16 which has stood by is sent to the pressure developing unit 22 at such a timing as to adjust the image on the media sheet 24. The media sheet 24 and the one of the image receiving sheet 16 laid thereon are sent between the pressing rollers 13 and 14 and pressed. This causes the microcapsules which are not hardened on the media sheet 24 to be broken and the image forming agent to flow out, and the developing material on the image receiving sheet makes a reaction to the image forming agent to develop color. The media sheet 24 which has thus passed through pressure development is taken up by the take-up shaft 25, while the one of the image receiving sheets 16 is subjected to a thermal treatment in the lustering apparatus 19, sent upwards by the discharger roller 20, and then, discharged into the sheet discharging unit 21.

Figure 4:
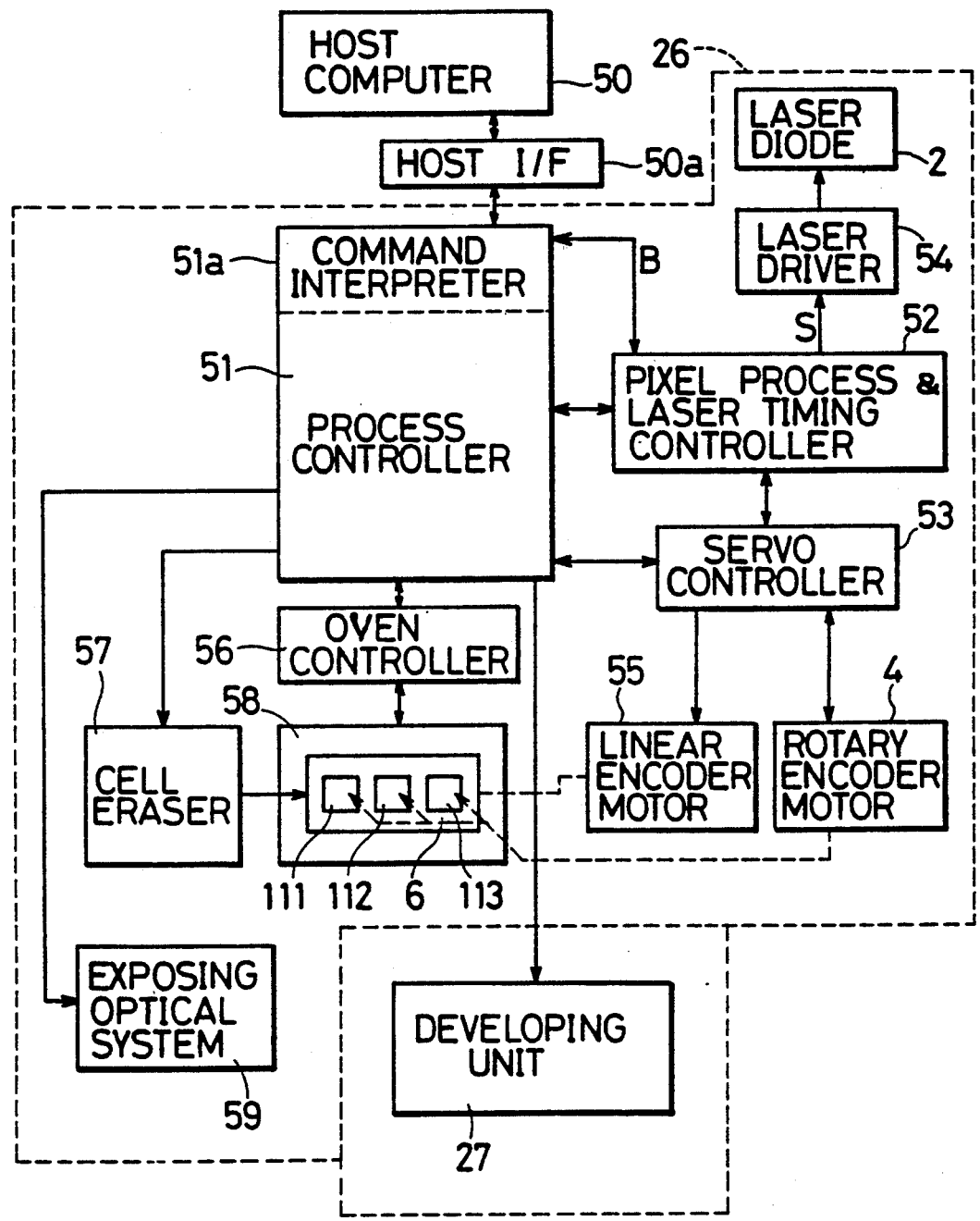
FIG. 4 is a block diagram showing the control unit of the embodiment shown in FIG. 1.

FIG. 4 is a block diagram showing a control circuit of the image writing and exposing unit 26, and a control operation in this embodiment will be described with reference to FIG. 4.

First, a command transmitted previous to actual image data is analyzed in a command interpreter in a process controller 51, and thereafter, in accordance with results of the analysis, the image data transferred from a host computer 50 through a host interface 50a are transferred through an inner pixel bus B to a pixel process and laser timing controller 52, which performs processing image data and adjusting a laser-on timing. In processing image data, original image data transferred from the host computer 50 is corrected in order to enhance color reproducibility, gradation and other qualities of an image. An algorithm for correction is determined so as to gain better quality of an image, allowing for an influence exerted upon quality of reproduced images by the media sheet 24 employed, the developing unit 27 and the image writing and exposing unit 26. In adjusting a laser-on timing, taking a timing with a servo controller 53 mentioned later, a laser drive signal S is produced at a suitable timing to a laser driver 54 and at a laser-on timing corresponding to image data to make the laser diode emit light. Laser beam emitted by the laser diode 2 is reflected by the primary scanning mirror 5 which is attached to a shaft of the rotary encoder motor 4 and irradiates a surface of the liquid crystal cell 6. Through a combination scanning of a laser beam scanning in the primary scanning direction by the linear encoder motor with a scanning in the secondary scanning direction by the linear encoder motor 55, an image is written in the cells 111 to 113 on the liquid crystal cell unit 6. A rotary encoder built in the rotary encoder motor 4 and a linear encoder built in the linear encoder motor 55 monitor a position of each encoder motor, and in accordance with position information obtained in this way, the servo controller 53 performs a required drive control for image writing. The position information received from each of the encoders (i.e., rotary and linear encoders) is also transmitted to the pixel process and laser timing controller 52 and utilized to control on-timing of the laser diode 2.

Information on images written on the liquid crystal cells 111 to 113 is read out by the exposing optical system 59, and light containing the information on the images is directed to the media sheet 24; that is, the exposing optical system 59 receives a signal from the process controller 51 to direct light from the exposing lamp 7 through the color filter unit 8 to the surface of th6, and it furthl cell unit 6, and it further leads light reflected by the liquid crystal cell unit 6 through the lens LS to the media sheet 24.

Figure 5:
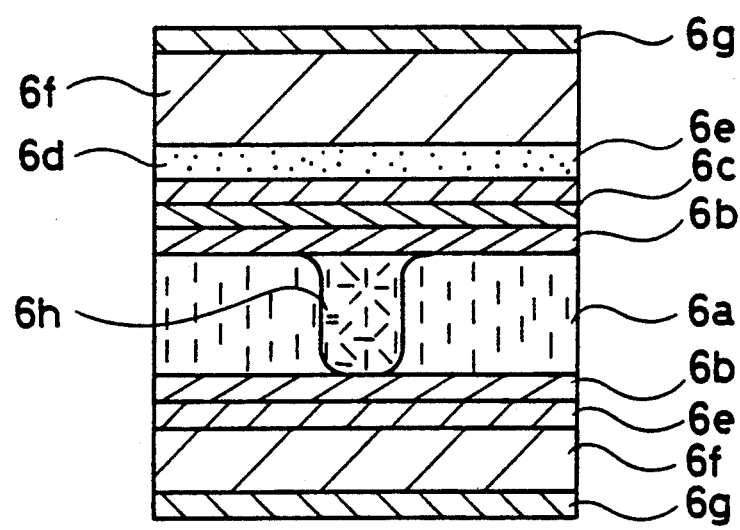
FIG. 5 is a diagram showing a structure of a major portion of a liquid crystal cell.
Figure 6:
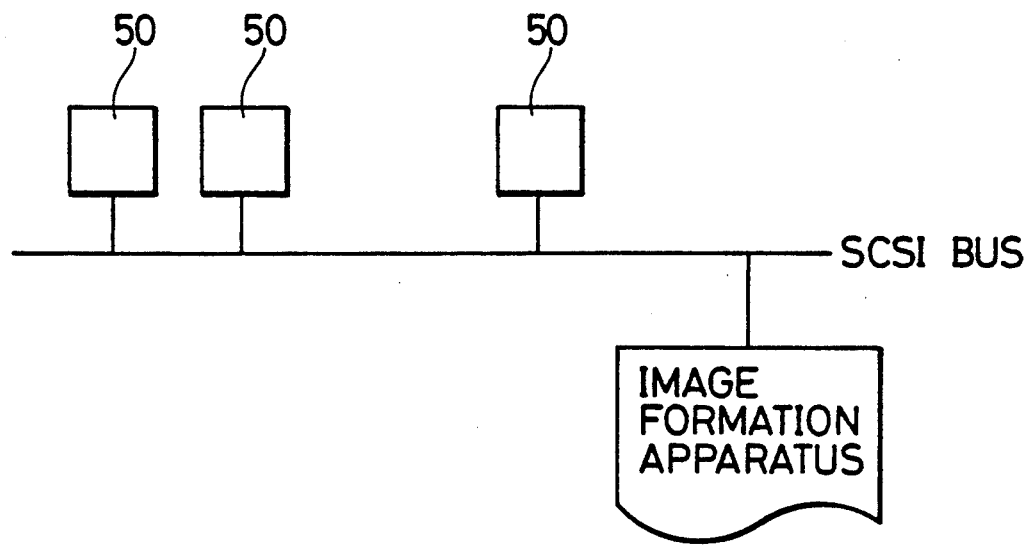
FIG. 6 is a diagram showing a connection system of the embodiment according to the present invention.

Each of the liquid crystal cells employed in this embodiment, as shown in FIG. 5 in its cross-section, is a laser heat writing and reflection type cell. A liquid crystal cell utilized in a laser heat writing method is especially called "liquid crystal light bulb", where a transparent electrode 6e is formed along the entire inner surfaces of two glass substrates 6f by which a smectic liquid crystal layer 6a is sandwiched. One of the substrates is formed with a laser beam absorbing layer 6d. When laser beam is converged into a spot of approximately 10 microns diameter on the liquid crystal cell, the absorbing layer 6d absorbs laser beam and generates heat, and when the heat is conducted to to the liquid crystal layer 6a, only a part 6h which is irradiated with the laser beam changes from a smectic (S) phase through a nematic (N) phase into an isotropic liquid (I) phase. Temperature of liquid crystal falls quickly when the laser beam is directed to any other spot, and in the course where the part 6h recovers from the I phase, to the N phase and further to the S phase, a orientation texture of light scattering property is constructed. The liquid crystal cell is in smectic phase at an operating temperature of the liquid crystal layer 6a, and it is set in an oven 58 under temperature control at about 51° C. by a oven controller 56 so that energy of laser beam irradiating the liquid crystal cell can cause a phase transition of an isotropic body. Liquid crystal in the remaining part which is irradiated with no laser beam has a transparent orientation texture, and the orientation texture of light scattering property, once formed, stably coexists with the transparent orientation texture. Thus, pixels of light scattering property are written in the liquid crystal layer by irradiation of laser beam, and moreover, an image with a gradation can be written by scanning a surface of the liquid crystal cell with an intensity modulation of laser beam (modulation of pulse width in unit of a single pixel). When light is directed from a reverse side of the liquid crystal cell which has an image on its right side, a part which was not irradiated with the laser beam in the liquid crystal layer 6a transmits the light, and a light reflecting layer 6c make a mirror reflection to return the light. However, the part 6h scatters the light. In this way, the liquid crystal cell unit 6 reflects light of an variable density image. It is necessary to change all the orientation into a transparent one to erase an image which is once written in the liquid crystal cell. The image is erased as follows: An orientation texture of light scattering property which is written through temperature variations caused by irradiating the liquid crystal cell with laser beam is canceled by applying a high electric field of a specific threshold value or over, and then, it recovers an initial transparent state. In such a procedure, thorough erasing of an image of light scattering property on the liquid crystal cell can be erased. In this embodiment, a cell eraser 57 is used to apply square wave voltage of about ±200 V to opposite terminals of the transparent electrode 6e so that a high electric field can be developed in the liquid crystal layer, and thus, the image can be completely erased.

Then, a major portion of this embodiment will be further explained in detail. The host interface 50a shown in FIG. 4 employs an SCSI (Small Computer system Interface) as defined in American National Standard for Information Systems of ANSI and X6051 (1990) of JIS. Thus, although the host interface 50a has a command set unique to the image formation device, it is effective only in an allowable range which ANSI and JIS, namely, national standards in the U.S. and Japan, limit as individual criterions, and conforms to the standard driterions. Then, since SCSI as well as a standard command is well-known in the art, a detailed description of them is omitted.

A system in which two or more host computers 50 are connected to a single image formation device is equivalent to a multi-initiator system in SCSI. In the SCSI multi-initiator system in this embodiment, naturally a target, or a command for an exclusive use of the image formation device, is prepared. It includes two commands: a reserve command (a reservation command to start an exclusive use) and a release command (a command to end the exclusive use). When the image formation device is exclusively used by one of the host computers 50, a reserve command recognizing unit within a command interpreter 51a detects a start of use of the image formation device, and a release command recognizing unit within the command interpreter unit 51a detects an end of the use. An arbitrary one of the host computers 50 never use the image formation device without first issuing a reserve command to keep an exclusive use, starting to print out, and then, issuing a release command to end the exclusive use when there is no need of the use of the image formation device, as shown in a flow chart in FIG. 7. At that time, in the image formation device, it is recognized that image data on a liquid crystal cell is needless to the host computer 50 which makes a release, and the image data on the liquid crystal cell is erased. Thus, even if image data from another host computer 50 is transferred, no overlapping of data occurs on the liquid crystal cell, but a normal image can be output. A command which is delivered from still another initiator, or another host computer 50, during an exclusive use of the image formation device is never accepted.

According to the present invention, when the image formation device is used connected to two or more image data output means, a previous image remaining in an optical image memory is never overlaid with a next image, and always a normal image can be printed out.

What is claimed is:

1. An image formation system comprising:

a plurality of image data output means for outputting data composed of three primary color image data for full color imaging, reserve command data and release command data, and an image formation means operatively connected with the plurality of image data output means, the image formation means comprising, printing means for writing the image from each of the image data output means in an optical image memory to print the image data on a medium;

reserve command recognizing means for recognizing the reserve command data from the image data output means;

release command recognizing means for recognizing the release command data from the image data output means;

control means for allowing one of the image data output means to exclusively use the printing means for writing the image data in the optical memory and printing the image data on the medium when the reserve command data from the image data output means is recognized by the reserve command recognizing means and to release the exclusive use when the release command data from the image data output means is recognized by the release command recognizing means; and erasing means for erasing images remaining in the optical image memory when the release command data is recognized by the release command recognizing means.

2. A system according to claim 1, the image data output means is a host computer.

3. A system according to claim 1, wherein the optical image memory includes liquid crystal cells on which laser light writes the image data.

4. A system according to claim 3, wherein the erasing means comprises means for applying a specified voltage to the liquid crystal cells to erase the remaining images.

5. A system according to claim 3, wherein the printing means comprises means for irradiating the liquid crystal cells with light to print the image data on the medium.

* * * * *